United States Patent

Trethewey

[15] 3,649,231
[45] Mar. 14, 1972

[54] METHOD AND APPARATUS FOR PRODUCING FIBERS WITH ENVIRONMENTAL CONTROL

[72] Inventor: William C. Trethewey, Newark, Ohio
[73] Assignee: Owens-Corning Fiberglas Corporation
[22] Filed: Oct. 19, 1970
[21] Appl. No.: 82,078

Related U.S. Application Data

[63] Continuation of Ser. No. 760,465, Sept. 18, 1968, abandoned.

[52] U.S. Cl. ............................................ 65/2, 65/12, 65/29, 65/161, 65/162
[51] Int. Cl. .................................................. C03b 27/04
[58] Field of Search .................................. 65/1–3, 11 W, 12, 65/29, 160–164

[56] References Cited

UNITED STATES PATENTS 3,002,226  10/1961  Warthen ................................. 65/1 X
3,374,074  3/1968  Russell et al. ......................... 65/161 X Primary Examiner—S. Leon Bashore
Assistant Examiner—Robert L. Lindsay, Jr.
Attorney—Staelin & Overman

[57] ABSTRACT

In a specific embodiment described herein there is disclosed a novel method and apparatus for producing glass fibers which includes the steps of issuing a stream of molten glass, attenuating the stream into a fiber, supplying heat to the feeder, regulating the amount of heat supplied to the feeder to maintain the molten glass at a desired temperature, and controlling the environment in a zone adjacent the stream and feeder to assist in fiber formation. A predetermined change in the effectiveness of the environmental control is detected and the effect of the regulation of heat supplied to the heater is modified to change the total amount of heat supplied in response to the detection of the predetermined change in the environmental control.

20 Claims, 4 Drawing Figures

INVENTOR.
WILLIAM C. TRETHEWEY

INVENTOR.
WILLIAM C. TRETHEWEY
BY
Staelin & Overman
ATTORNEYS

METHOD AND APPARATUS FOR PRODUCING FIBERS WITH ENVIRONMENTAL CONTROL

This application is a continuation of Ser. No. 760,465, filed Sept. 18, 1968, now abandoned.

The invention is herein exemplified by reference to the production of continuous glass fibers wherein streams of molten glass are attenuated mechanically into continuous fibers or filaments of small diameter and then grouped into a strand and wound into a package. However, the scope of the invention is not limited thereto but is intended to cover all areas in which its teachings may be applicable.

In greater detail, the process herein described involves flowing streams of molten glass from orifices from an electrically heated bushing or feeder associated with a container reservoir in which the material is reduced to a molten condition. The orifices may be formed in projecting tips, nipples or ridges from which heat of the glass is dissipated as it flows in the form of streams therefrom, in the apex of a V-shaped feeder, and other structural arrangements such as a flat plate feeder made of an alloy which is nonwetting in the presence of specified gases.

Upon emission to the atmosphere the streams of glass each neck down, as determined by the viscosity and surface tension, to form a conelike body of the glass which is attenuated to its final diameter. The cohesive forces which transmit the attenuation from the fiber to the body of the cone are closely related to the viscosity of the glass. Surface tension of the glass also contributes the transfer of forces over the periphery of the cone, but, in addition, acts to bring about constriction of the stream into a conical configuration. As the temperature of the melt increases the viscosity of the fluid from which the fiber is made is lowered and eventually it reaches a point where it offers little resistance and the surface tension will actually constrict the material into beads or droplets instead of flowing as a continuous stream. A high viscosity in such fluid, on the other hand, offers higher resistance and slows the constricting forces to such an extent that the viscosity of the fluid is a major factor in determining stability in the fiber-forming zone.

Taking these facts into consideration, it can be seen that if the viscosity of a given glass emitted from an orifice to a forming cone is too high, the tension required to be applied to the fibers to effect attenuation of the cone can be so high as to result in breakage of the fiber. At the more fluid end of the viscosity range, however, the glass flows more freely and the balance against surface tension becomes somewhat indefinite, which causes a form of pumping action or dancing movement of the cones at the fiber tips. The further lowering of the viscosity of the glass results in an approach towards constriction by the surface tension to the extent that discontinuous separate droplets of the fluid are formed. Low viscosity may also cause a "flooding" condition in which the molten glass wets out around the orifices, whether the orifices are formed in projecting tips, in a flat plate, or in a V-shape feeder, so that the orifice area of the feeder becomes flooded preventing fiber formation.

A range of viscosities therefore exists within which fiberization of the glass can be accomplished but above and below which fibers are difficult or impossible to produce.

In order to aid and assist in fiber formation apparatus and methods have been introduced to the art in which an environmental control has been established in the attenuation zone adjacent the streams, cones and orifice area of the feeder to effect a cooling or temperature control of the glass in the fiber forming or attenuation zone, to reduce or prevent the "wetting-out" or "flooding" characteristics or tendencies, to treat the glass, to control the temperature, to reduce disruptive air currents and generally provide an environment in which certain types of fibers may be formed.

Water cooled members have been disclosed for disposition immediately adjacent the fiber-forming cones in noncontacting relation with the feeder to absorb heat from the cones by way of radiation absorption and to divide the total number of tips in their respective cones into smaller groups. The shield members shield the environment of the tips or orifices and the fiber-forming cones emitted against extraneous turbulence of the atmosphere outside the zone of fiber formation. The presence of such cooled shield members have made it possible to extend the viscosity range permit fiberization of glass heated to a higher temperature than could have otherwise been fiberized by fluid emitted in an unshielded fiber-forming zone. The fact that the melt can thereby raise to a higher temperature also permits production of fibers of greater uniformity and permits fiberization of glasses which previously were not fiberizable while at the same time making operating conditions less critical to temperature variations due to turbulences in the surrounding atmosphere. By provision of cooled shield members in the zone of fiber formation, the rate of cooling of the glass emitted from the feeder is not left to the variant condition of the atmosphere but provides a greater control of the rate of cooling and makes the conditions of fiber formation more certain.

An additional feature which resulted from the adoption of environmental control for fiber-forming operations was the increase in the number of rows of tips in a given feeder from which fibers could be attenuated. Previously, the number of rows in a given feeder were limited to adjacent rows because if an additional third row were included in a feeder the center row would be so high in temperature from energy radiated to the center row of tips from the outside rows that the glass emitted therefrom would be so fluid as not to allow stable formation of fibers. With the presence of environmental control, in this case shield members, the number of rows could be increased to many more. The increased number of rows are highly desirable because the length of the feeder can be greatly reduced for a given number of fibers to be produced, correspondingly reducing the amount of precious metals such as platinum which is usually used in glass fiber feeder construction.

One difficulty presented in the use of such shield constructions in association with glass fiber feeders was that after a period of time, volatile materials emitted by the molten glass were deposited over the shield member surfaces adjacent the cones so that after a period of time the shield constructions were required to be cleaned in order to make them fully effective again. Thus, this particular type of environmental control had to be removed from the environmental control zone in order to effect a cleaning of the shield members.

The removal of the environmental control means causes a total temperature rise in the orifice area of the feeder of, for example, 100° in certain production bushings. The problems discussed hereinbefore with respect to low viscosity of molten glass then come to the fore. One of the more difficult situations presented is that, in order to prevent a flooding or wetting-out of the orifice area of the bushing, the operator was required to make a manual adjustment in the heat supplied to the feeder to seal off or raise the viscosity of the glass during the fin-cleaning operation. After the fins were cleaned and replaced in environmental-controlling position the operator then must raise the temperature of the feeder to a fiber-forming temperature desired. Not only is this a laborious process, since the temperature should be raised over a period of time in order to prevent a sudden surge of current to the bushing and burnout thereof, but, in the formation of very fine or very small diameter fibers, the temperature control of the bushing is exceedingly critical and manual adjustment makes obtaining the temperatures desired very difficult.

In more recent advances there have been disclosed other environmental control means which includes a fin-shield structure for fiber-forming units wherein the cooled surfaces adjacent each fiber-forming cone are pervious, or in other words gas permeable, and are retained in cooled condition by passage of air therethrough, the air being effective both to provide the cooling for the heat absorption required and at the same time helping to clean the member by conveying away particles which might tend to deposit upon the surface. In this structure air alone was conducted through the fin-shield. In this type of environmental control it may be seen that a loss of airflow from the permeable member would cause a loss of environmental control which may introduce the problems discussed hereinbefore. Further, a sudden or abrupt rise in temperature of the gas being conducted through the fin-shield may effect a loss of environmental control.

The series of hollow longitudinal gas-permeable members discussed in the preceding paragraph have been utilized to conduct fixed quantities of vaporizable fluid in the zone of attenuation of the streams in locations between the streams. The liquid in the tubes is continuously transformed into gas within the tube to absorb heat by such transformation and to provide an atmosphere in the zone composed at least partly of the gas evolving through the gas-permeable walls of the hollow, gas-permeable members carrying the liquid. The fixed quantities of liquid within each hollow member are replenished at a rate matched directly to the rate of consumption of the liquid from the quantity as it it transformed into the gas within the hollow member. Heat removal from the fiber-forming zone is thus accomplished by radiation absorption by the shield members themselves, by convection removal of heat with induced air and the gases emitted through the permeable walls of the shield member and, in addition, by absorption of heat in transforming the contained liquid to gases. It again can be seen that loss of environmental control may obtain when the quantities of liquid being replenished in each hollow member either ceases or changes to cause a loss of control by the reduction of heat absorption in transforming the contained liquid to gases and by the loss of convection resulting from the induced air and the bases emitted through the permeable walls.

Although air is above described as the gas used to effect continuous cleaning and cooling of the pervious shield members, it will be recognized that other gases can also be used for such purposes. It has further been discovered that certain gases coat or "plate" the feeder area adjacent the orifices thereby preventing the wetting of the glass and flooding of the feeder surface adjacent and between the orifices with molten glass. Flooding interferes with the formation of the cones and the attenuation of fine filaments. These gases are useful both in the flat-plate type of feeder and the feeders having projections therefrom in which orifices are formed. These gases are thus used to establish an environmental control in that a higher temperature and lower viscosity glass may be attenuated into fibers while the wetting-out or flooding may be avoided. Further, this environmental control enables the use of a flat-plate type feeder which doesn't have projecting tips depending therefrom. Loss of flow of the coating or plating gases in this type of environmental control would again provide an environmental control loss or reduction in effectiveness which would diminish or cause a loss of the ability to form fibers.

There have been problems encountered in the utilization of such gases in the attenuation zone or fiber-forming area, however, since many of the gases useful for such purposes will "break down" under the influence of the heat in the area before their purpose can be accomplished. Methane and propane are examples of such a coating or "plating" gas which tend to be broken down by the heat in the environment of the attenuation zone. The mere circulation of such gases through permeable conduits into the attenuation zone does not permit retaining control of the temperature of the gases that is desirable for particular production techniques. This is true whether the gases are to be used for "plating" the feeder, treating the cones and filaments, cooling the feeder or cones, or a combination of these and other effects.

The permeable conduits heat up in the attenuation zone and the passage therethrough of the gases is insufficient to overcome the absorption of heat by the gases. If sufficient quantities of the gases were passed through the fin structures, the velocity and quantities would have disruptive effects in the formation of filaments or fibers. To overcome this problem a heat exchange medium has been placed in heat exchange relationship with the gas in the environmental control zone. This has been accomplished by placing a medium carrying conduit in heat exchange relationship with the gas carrying conduit, either on the exterior or interior of the gas conduit. It may thus be seen that a failure in flow of the heat exchange medium would cause the plating or coating gases to break down and would result in a loss of environmental control which would effect the desired fiber formation.

In view of the foregoing it is an object of the present invention to provide an improved method and apparatus for producing fibers from heat-softenable material.

It is a further object of this invention to provide an improved method and apparatus for producing fibers which includes monitoring the effect of the environmental control to provide an indication of its effectiveness and to modify the production process in accordance with the indication.

It is a still further object of this invention to provide an improved method and means of utilizing environmental control in the production of continuous glass filaments.

Additionally, it is an object of this invention to provide method and apparatus for automatically controlling the production of continuous glass filaments when utilizing environmental control to aid and assist in fiber formation.

In carrying out the above objects there is featured herein method and apparatus for producing glass fibers which includes issuing a stream of molten glass from an orifice formed in the feeder, heating the feeder, regulating the amount of heat supplied to the feeder to maintain the molten glass at a desired temperature, attenuating the stream into a fiber, controlling the environment in a zone adjacent the stream and feeder to assist in fiber formation, monitoring the environmental controlling, and reducing the amount of heat supplied to the feeder in response to the detection of loss in environmental control by the monitoring. The method may further include restoring the heat supplied to the feeder to the preloss amount in response to the detection of restoration of effective environmental control by the monitoring. The monitoring may include measuring the rate of change of the temperature of the orifice area of the feeder.

The environmental controlling may include releasing feeder plating gaseous material in the zone, the monitoring then including detecting a diminishment of release below an effective plating amount. Further, the environment controlling may include releasing cooling gases in the zone, the monitoring then including detecting a diminishment of cooling effect of the gases below a predetermined level. The diminishment of cooling effect may be measured by monitoring the flow of gases into the zone and detecting a reduction or an increase of flow. The monitoring may further include detecting a predetermined rise in temperature of gases being released in the zone.

The environment controlling may include placing at least one heat-removing element in heat transfer relationship with a stream in the zone, and the monitoring may then include detecting the removal of said element from the zone. Alternatively, or in addition to the detection of removal of the element, the detecting may also include sensing a predetermined rate of change of temperature in the zone.

The environment controlling may further include passing a heat exchange medium in the heat transfer relationship with the element to remove heat from the zone. The monitoring may then include detecting a predetermined change in temperature in the heat exchange medium to indicate removal of the element from the zone. The environment controlling may include passing a heat exchange medium through the zone in heat transfer relationship with the stream and monitoring the flow or passage of the medium through the zone to detect a cessation or increase of flow of the heat exchange medium through the zone.

Apparatus embodying the teachings of this invention is disclosed herein which comprises feeder means for retaining a supply of molten glass, the feeder means having a plurality of orifices formed therein for issuing a plurality of streams of molten glass. Means are shown for attenuating the streams into glass fibers and for regulating the amount of heat supplied to the feeder means to bring the molten glass to and to maintain the molten glass at fiber-forming temperatures. Means are provided for effecting environmental control in a zone adjacent the streams and the orifices to assist in fiber formation. The absence of environmental control may be detected and an "absent" signal generated so that means responsive to the "absent" signal may maintain the molten glass at a temperature below fiber-forming temperatures to seal off glass flow through the orifices in the feeder. Means for detecting the presence of environmental control may be further included which will generate or provide a "present" signal. Means responsive to the "present" signal are utilized for enabling the regulating means to maintain the molten glass at fiber-forming temperatures.

Other objects, advantages and features will become apparent when the following description is taken in conjunction with the accompanying drawings, in which.

Figure 1:
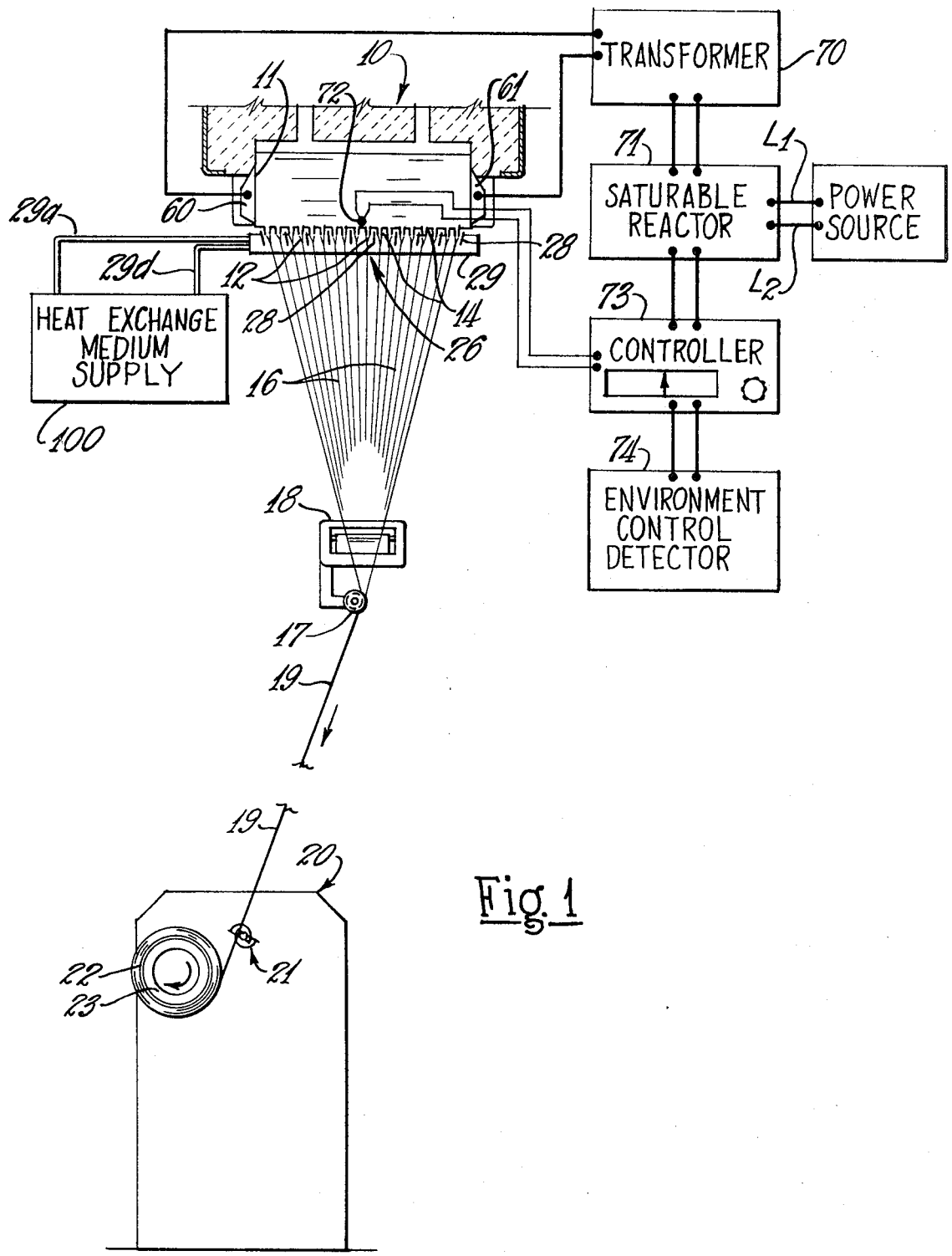
FIG. 1 is a view of a general layout of apparatus including shielding components for establishing environmental control in the production of continuous glass fibers in accordance with the principles of the present invention.
Figure 3:
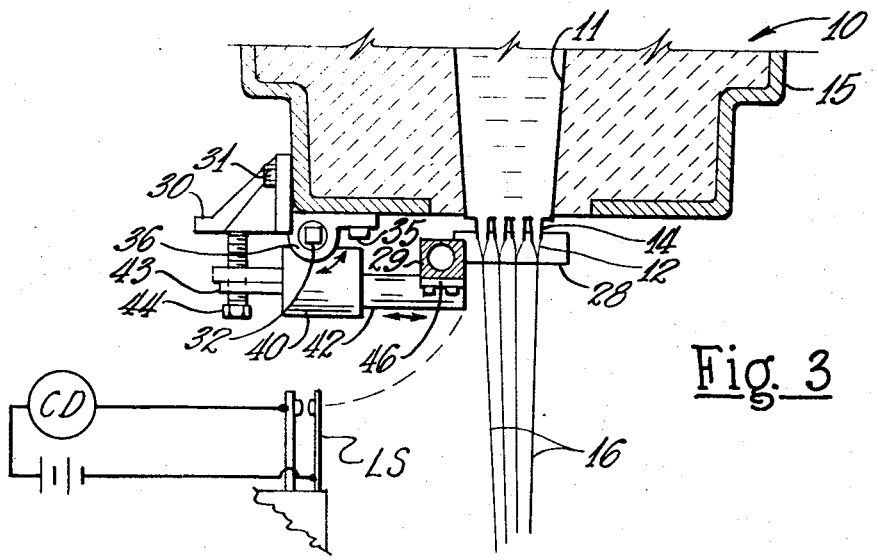
Figure 4:
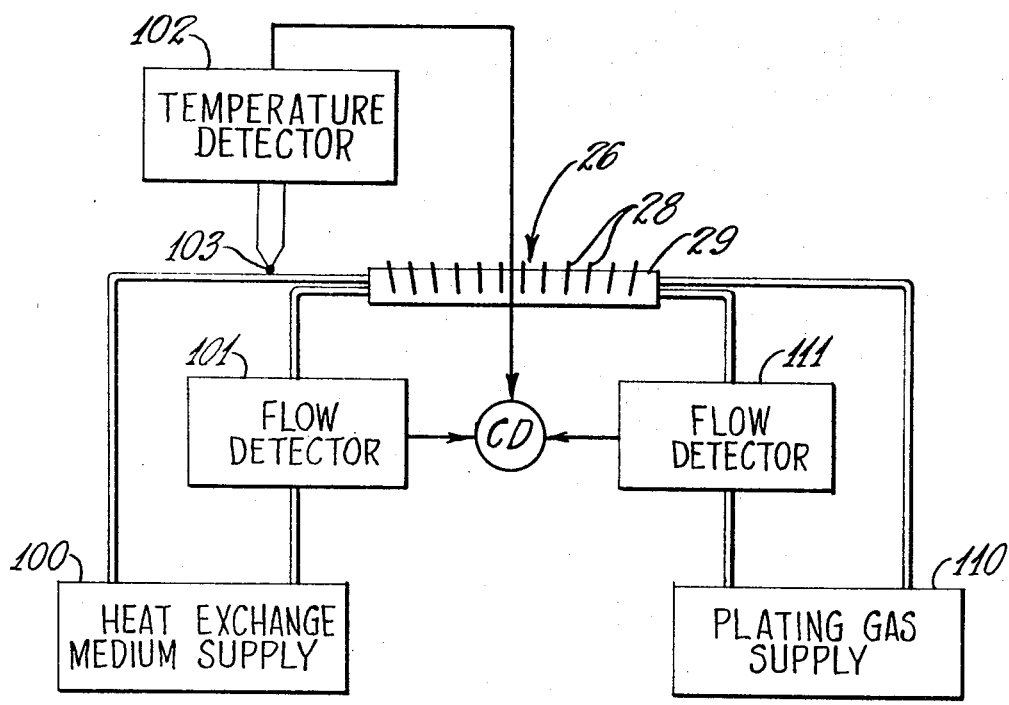

FIG. 3 is a side elevational view partially in cross section, of the glass feeder and associated shield construction shown in FIG. 1 illustrating an additional means for detecting the presence or absence of environmental control; and FIG. 4 is a front elevational view of an environmental control apparatus in which one or more types of environmental control may be effected and in which the loss of one or all of the types of environmental control may be detected.

Referring now to the drawings, FIG. 1 illustrates a portion of a refractory furnace 10 for reducing a body of glass to molten condition and having a bushing or feeder 11 associated therewith from which a plurality of streams of glass are emitted or issued from orifices in the feeder for attenuation into fibers 16. Fibers are gathered into a strand 19 by drawing them over a gathering member 17 while sizing fluid is applied to the fibers by a roll-type applicator 18 which supplies a sizing to each filament above the point of collection at the gathering member 17. The strand 19 formed by the gathered fibers is packaged by a winder 20 which collects the strand on a tube 22 mounted on a rotating collet 23 and traversed by a suitable traversing device such as a spiral wire traverse 21. The winder 20 provides a force of attenuation for the fibers by reason of rotation of the collet which develops tension in each fiber to withdraw it from the molten glass stream flowing from the feeder.

The environmental control means generally indicated at 26 provides a plurality of heat removing and/or gas-emitting members in the form of shield units 28 each extending across the bottom of the feeder between a pair of rows of feeder tips 14, while each adjacent pair of such members has one or more rows of tips aligned therebetween. The orientation of the fins or shield units 28 across the under part of the feeder, with the feeder tips aligned therebetween may be seen in FIGS. 1 and 3 which illustrates that the tips 14 and cones 12 emitted therefrom are, in effect, divided into crosswise pairs of rows.

The shield units 28 extend from a longitudinal header means 29 disposed laterally with respect to the feeder structure. A heat exchange medium, for example a liquid such as water, may be supplied to a conduit 29a to, and formed in, the header 29 from a supply 100 and return to the supply via conduit 29d. The heat exchange medium may be circulated only in the header 29 to increase the effectiveness of header 29 as a heat sink from which heat is removed by the heat exchange medium. Alternatively, or in addition to, the heat exchange medium may be circulated not only through header 29 but also through or around the outside of heat shield members 28 to further remove heat from the shield members and from the environmental control or attenuation zone.

The heat exchange medium supply 100 preferably includes means for cooling or otherwise removing heat from the circulating medium. The medium in most cases can be a fluid such as water which is taken from a supply wherein the temperature is controlled, however, the medium may be any coolant which will provide the desired control. For example, a gas may suffice if properly cooled and circulated. A refrigerant may be expanded in the heat exchange area to effect cooling if more cooling capacity is required.

The heating current for an individual feeder 11 may be alternating current supplied over a main power supply line from a power source by way of conductors L1 and L2. The power source, for example, may be a 440-volt, 60-cycle source.

The alternating current is supplied to the feeder through a transformer 70 to terminals 60, 61 connected to the bushing 11. The transformer 70 reduces the voltage, for example to a value in the order of 2 volts, which; since feeder 11 is made of low-resistance, high-temperature metal such as platinum; is capable of providing heating current in the order of one or more kilo-amperes. The primary loop of the power circuit for the bushing 11 may contain a power regulator or controller such as a saturable core reactor 71 which acts as a variable impedance to permit adjustment of the current flow through the feeder for the temperature desired. Other suitable regulators, such as silicon controlled rectifiers may be used. The saturable core reactor is cooperatively associated with one or more thermocouples 72 attached to the feeder 11, advantageously in the orifice area of the feeder, to sense and generate an electrical signal corresponding or proportional to the actual feeder temperature.

The thermocouple 72 may be connected to an amplifier contained in a controller 73 which amplifies the temperature signal supplied from the thermocouple to the controller 73. The controller 73 may be manually set by an operator to a predetermined setpoint temperature, which is based upon past history and experience in operating similar systems, to provide a setpoint temperature which is believed to be desirable or within a desired range. Alternatively, the controller 73 may be computer controlled in which the computer sets the setpoint temperature at that desired for a particular job and as determined to be best for the particular feeder and fiber-forming components involved. The controller 73 may generate a signal proportional to the desired temperature setpoint for forwarding to the saturable reactor 71 or to be algebraically combined with the actual feeder temperature from thermocouple 72 or modified thereby to provide a control signal for the saturable reactor 71.

The controller 73 may include a regulator directly affected by the combination of the signals hereinbefore discussed, plus the signals to be hereinafter described, to supply direct current to the saturable reactor 71 or other control device to modify the impedance offered by the reactor in the primary of the feeder power circuit to provide automatically a desired feeder temperature. When the temperature of the feeder tends to rise above the setpoint as modified by the signals discussed herein, the direct current supplied from the controller 73 to the saturable core reactor is reduced, thereby enlarging the impedance offered by the reactor 71 and diminishing the current flow in the secondary or feeder loop connected to the terminals 60, 61. If the temperature of the feeder tends to drop below the setpoint as modified, the controller may act to supply additional direct current to the reactor 71 thereby reducing the reactor impedance and increasing the current flow in the secondary or feeder loop for rise in temperature in the feeder 11. The feeder in this embodiment is thus maintained at a temperature for normal operation which is determined by a preselected setpoint as modified to an operating setpoint by the signals discussed herein.

Also illustrated in FIG. 1 in block diagram form is an environmental control detector 74. The detector 74 is operative to detect a loss of, the absence of, or the diminishment of effective environmental control so that a modification may be made in the production of the fibers. As discussed hereinbefore, the loss of environmental control may result in a flooding or wetting-out of the orifice area of the feeder 11. To prevent the flooding, the environmental control detector herein is operative to detect a condition which will lead to flooding and modify the signals supplied by controller 73 so that the temperature of the feeder and molten glass therein is reduced by a predetermined amount, for example 100° F., to cause the viscosity of the glass to become sufficiently high in the orifices so that a seal off of glass flow will occur, preventing the flooding. On the other hand the environmental control detector may be utilized to detect the presence of the effective environmental control to enable the controller to again provide or initially provide a control signal to the saturable reactor which will bring the glass within the feeder 11 to a desired fiber-forming temperature.

Figure 2:
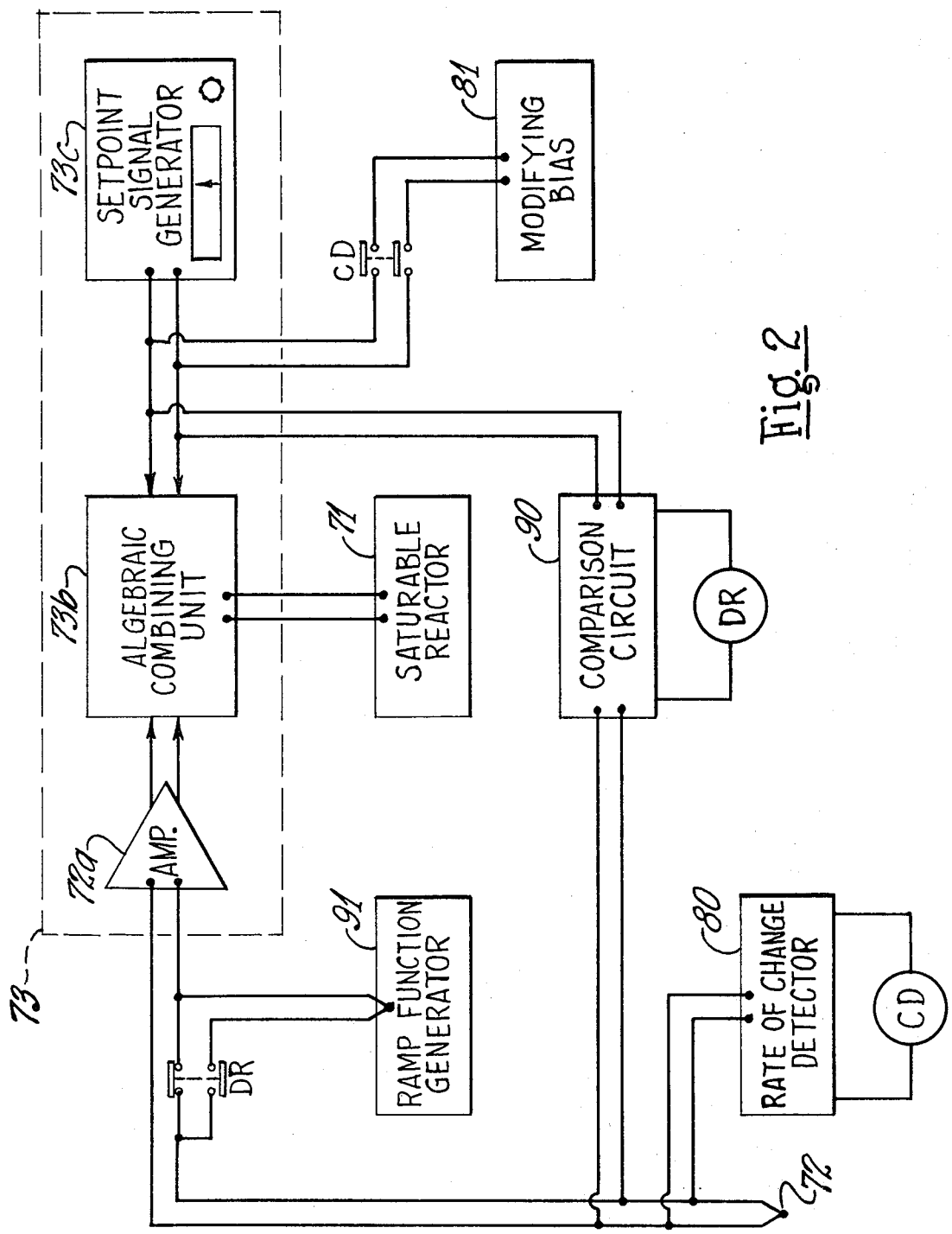
FIG. 2 is a block schematic diagram illustrating control features embodied in the teachings of this invention.

Referring to FIG. 2 there is illustrated in greater detail one embodiment of a control circuit for providing the control functions discussed hereinbefore. It will be noted that the thermocouple 72 is shown as supplying actual feeder temperature signals to the controller 73. In this instance the controller 73 comprises an amplifier 72a, an algebraic combining unit 73b and a setpoint signal generator 73c. The controller may be analog or digital in operation. The output of the controller is connected to provide a control signal to the saturable reactor 71 as illustrated in FIG. 1.

The means for detecting a loss of environmental control in FIG. 2 is a rate of change detector 80 which is connected to sample the temperature signal supplied by thermocouple 72. The signals from thermocouple 72 are a measure of the presence, absence or diminishment of effective environmental control. In this instance it is assumed that the interruption of environmental control will be the removal of the shield members 28 from their environmental controlling position adjacent the feeder to a position away from the feeder for cleaning or other maintenance or repair. In one experimental setup it was discovered that when the shield units are removed from their environmental controlling position the total temperature rise sensed by thermocouple 72 is approximately 100° F. This temperature rise occurred at the rate of 60° to 70° per second which is sensed by the rate of change detector 80. In order to avoid erroneous energization of the change detector relay CD which is responsive to a signal from the detector 80, a predetermined magnitude of rate of change is selected for energization of relay CD so that normal control operations and temperature changes resulting therefrom will not energize relay CD. For example, the rate of change may be selected as 10° per second.

When the rate of change as sensed by detector 80 is more than 10° per second the change detector relay CD is energized. The relay CD may be a latching relay which latches in the energized position or contact closed position when the predetermined positive change rate is detected. When the shield members are put back, then the cooling resulting therefrom causes a negative change in temperature which may again be picked up by detector 80 and which provides a current flow to relay CD which will reset the latching relay or trip the mechanical means which may be holding the CD contacts closed.

As noted hereinbefore the controller 73 may include a setpoint signal generator 73c which generates a signal proportional to a desired setpoint temperature. This signal is combined with the amplified signal from thermocouple 72 in an algebraic combining unit 73b to provide an operating setpoint or control signal to saturable reactor 71. This control signal is then effective to maintain the molten glass at fiber-forming temperatures.

When it is desired to modify the temperature of the molten glass as the result of a loss of or interruption of environmental control a modifying bias unit 81 may be utilized which will generate a signal which may be connected to subtract from the signal of the setpoint generator 73c. This will result in a change of signal to saturable reactor 71 wherein temperature of the molten glass is reduced sufficiently so that the streams will solidify in the orifices preventing the flooding or wetting-out condition which is undesirable. Thus the contacts CD, as effected by the rate of change detector 80, latch in their closed position and remain latched until manually reset or until reset because of the detection of the return of the shield members 28 to their environmental controlling position. The reset of the relay CD, whether manually or as the result of a signal from detector 80, will permit or enable controller 73 to return or attempt to return the molten glass in bushing 11 to fiber-forming temperatures since the modifying bias from unit 81 has been disconnected by the opening of contacts CD.

Since the "actual" temperature of the feeder may be considerably below the desired fiber-forming temperature, a sudden surge of a current to bushing 11 may result. Accordingly, to prevent a surge of damaging current to the bushing 11, a comparison circuit 90 is utilized in association with a ramp function generator 91 to prevent bushing damage. That is, comparison circuit 90 detects the desired setpoint as measured by the setpoint signal from generator 73c and the actual temperature as measured by thermocouple 72 to detect a difference which is in excess of a normal control range. A normal control range may be 5° for example.

A deviation between the actual and the desired setpoint temperatures of more than 5° may be utilized to energize differential relay DR. When relay DR is energized DR contacts close to connect the ramp function generator 91 in series with the thermocouple 72 and to disconnect the thermocouple 72 from direct application to amplifier 73a.

The ramp function generator 91 is operative to control the heat up of a feeder so that only preselected steps of heating current are applied over a period of time to prevent burnout or damage of the bushing. The stepping or ramp function as provided by unit 91 may be accomplished by a program step up via a digital computer which provides the necessary signal. Alternatively, the ramp function generator 91 may be analog in character and the same as or similar to a ramp function generator as disclosed in application Ser. No. 293,994, filed July 10, 1963, entitled "Programming Apparatus."

In the latter device a thermocouple is associated with a resistor and a heat storage device to sense the temperature and provide a signal in response thereto. A power means or input signal is selectively connected to cause the resistor to be heated. The heat storage device or heat sink will store the heat or energy from the resistor. The thermocouple in this ramp function generator may be used to provide an electrical output during the heat storage time and/or to provide an electrical output after the heating of the resistor has ceased. The thermocouple associated with a ramp function generator may then be connected with thermocouple 72 to provide a signal which, when additively combined, provides a control temperature signal that regulates the magnitude of power that the controller and the saturable core reactor will allow the transformer to supply to the feeder. The rate at which the temperature of the feeder 11 may be raised during the energization of the ramp function generator depends upon the time constant of the decay of the heat stored in the heat accumulator of the generator 91.

Whichever type of programmer is utilized in the apparatus of FIG. 2, when the actual temperature reaches a point within a normal control range, relay DR drops out or is deenergized and the ramp function generator 91 is disabled illustrative disconnected from the control circuit and thermocouple 72 is again connected to feed a signal directly to the controller 73 which is proportional to the actual temperature of the feeder.

It will be noted that the comparison circuit 90 and the ramp function generator 91 also operate in the same manner during start up of the fiber-forming station to bring the feeder from a room or ambient temperature to the desired fiber-forming temperature.

Thus, there has been provided a control system for automatically halting the flow of glass from the bushing when an environmental control is diminished in effectiveness or is lost completely. Provision is made for restarting the flow of glass or bringing the molten glass to fiber-forming temperatures when there is a resumption or restoration of effective environmental control.

Referring to FIG. 3 there is illustrated another means for energizing change detector relay CD in response to the actual physical movement of the fin shield members 28 from their environmental controlling position. The mounting means for the environmental control apparatus including fin-shield members 28 includes a mounting bracket 30 designed for securement to the side of a jacket 15 of the glass containing unit 10. The bracket 30 is secured to the side of a jacket by a suitable fastening screw 31 and is more rigidly fixed in position by a second right-angularly related setscrew 35 screwed into abutting relationship with the bottom of the jacket. A rotatable support shaft 32 is held in longitudinal parallel relationship with the feeder 11 by one or more spaced bearing collars 36, fixedly associated with the mounting bracket.

The header 29 of the shield unit is mounted on a table surface 46 provided on a tilting bracket 42 which in turn is adjustable associated with a pivot bracket 40 mounted on the shaft 32 between the collars 36. The pivot bracket permits the raising and lowering of the fins 28 about the shaft 32 as a pivot by adjustment of the screws 44 extending in right-angular relation through a pair of arms 43 to the underside of the mounting bracket on the side of the shaft 32 opposite to that on which the fins 28 are located.

It can thus be seen that when screws 44 are removed the fins 28 may be pivoted out of their environmental controlling conditions shown in FIG. 3 downwardly to a point where the fins may be cleaned, replaced or otherwise maintained. A limit switch LS may be placed in the pivot path of the fin carrying unit so that when the fins are pivoted from their environmental controlling position contacts of the limit switch LS are closed to energize the relay CD.

It will be noted that the bracket 42 may be moved laterally in and out of environmental controlling position for fins 28. Therefore, a limit switch may also be placed in the path of the lateral travel of the header 29 for actuation thereby to energize relay CD to provide an indication of the presence or absence of environmental control means adjacent the feeder.

The closure of contacts CD upon energization of the relay CD may be utilized to effect a modification of the temperature control signal or a modification of the setpoint of the controller 73, by the connection of a modifying bias unit as illustrated at 81 with the effect as hereinbefore described with respect to the apparatus in FIG. 2.

Referring to FIG. 4 there is illustrated an environmental control unit generally indicated at 26 which may provide any of the environmental controls discussed hereinbefore. Various means are illustrated for detecting the loss, absence or diminishment of effective environmental control.

A heat exchange medium from medium supply 100 may be circulated through the header 29 and/or through hollow members 28 or across the fiber-forming face of the feeder 11. A flow detector 101 may be utilized to detect a change in flow or absence of flow which would indicate a loss of environmental control and provide a signal to energize the relay CD. A temperature detector 102 may be utilized to sense the temperature of the circulating heat exchange medium through thermocouple 103 to provide a signal when the heat exchange medium rises in temperature either because of a change in operating conditions for the fiber-forming station, a lack of sufficient flow, or a failure or decrease in efficiency of cooling apparatus which may be included within the medium supply unit 100. In response to a detection of any of these conditions a signal may be provided from temperature detector 102 to energize relay CD. It should be noted that the heat exchange medium from unit 100 may be liquid, gas or a combination.

A plating gas supply 110 is also illustrated which may supply a plating gas as discussed hereinbefore or a cooling gas or a combination of the two to the shield units 28. A flow detector 111 may again be utilized to detect flow failure or a diminishment of flow which would effect the environmental control. A signal from the flow detector 111 may be utilized to energize relay CD. The relay CD is operative upon energization to modify the operation of the controller 73 as discussed hereinbefore with respect to FIG. 2.

There has thus been described apparatus for producing glass fibers which comprises feeder means for retaining a supply of molten glass, the feeder having at least one orifice formed therein for issuing a stream of molten glass, means for attenuating a stream into a fiber, means for supplying heat to the feeder, and means for regulating the amount of heat supplied to the feeder to maintain the molten glass at a desired temperature. Means are illustrated for controlling the environment in a zone adjacent the stream and feeder to assist in fiber formation. Means are provided for detecting a predetermined change in effectiveness of environmental control and means responsive to the detective means modifies the regulating effect of the regulating means to change the amount of heat supplied to the feeder.

The environmental control means may include at least one heat removal element in heat transfer relationship with the stream. The detecting means may then include means for detecting the presence or absence of the heat removal element in the zone in the heat transfer relationship. The presence detecting means may include means for sensing temperatures for temperature changes in the zone or may be a limit switch arrangement which senses actual physical position of the heat removal element. The detecting means may detect a loss of environmental control and provide a "loss" signal. The means responsive to the loss signal may reduce the amount of heat supplied to the feeder means to cool the molten glass below fiber-forming temperatures. The detecting means may comprise means for measuring the rate of change of temperatures sensed by an orifice area or feeder temperature sensing means. The detecting means may further detect a resumption of effectiveness of environmental control and provide a "present" signal. Means responsive to the present signal enable restoration of molten glass to fiber-forming temperatures.

The apparatus may include measuring the difference between a desired temperature and the actual temperature of the feeding means. Means responsive to a predetermined measured difference between the desired and actual temperatures may be utilized to control the rate of increase of heat applied to the feeder means to prevent damage to the feeder means.

The orifice area or feeder temperature sensing means may generate a signal proportional to the orifice area or feeder temperature and thus the temperature in the environmental control zone. The regulating means may include means for generating a signal proportional to a desired setpoint fiber-forming temperature and means for combining the orifice area or feeder and setpoint temperature signals to provide a control signal to maintain the molten glass at fiber-forming temperatures. The means for reducing the temperature of the molten glass and the feeder may include means for reducing the setpoint temperature signal by addition of a bias signal thereto.

In conclusion it is apparent that, within the scope of the invention, modifications and different arrangements may be made other than those herein disclosed and that there may be varying applications for the invention. Therefore the present disclosure is illustrative merely, the invention comprehending all variations of the disclosure where applicable.

I claim:

1. A method of producing glass fibers comprising the steps of issuing a stream of molten glass from an orifice formed in a feeder, heating said feeder, regulating the amount of heat supplied to said feeder to maintain said molten glass at a desired attenuating temperature, attenuating said stream into a fiber, controlling the environment in an attenuation zone adjacent said stream and feeder to assist in fiber formation from said stream, monitoring the presence of said environmental control in said zone, and reducing the amount of heat supplied to said feeder to restrict stream flow in response to the detection of loss of the presence of environmental control in said zone by said monitoring.

2. A method as defined in claim 1 which further includes restoring the amount of heat supplied to said feeder to the preloss amount of heat in response to the detection of restoration of effective environmental control in said zone by said monitoring.

3. A method as defined in claim 1 in which said monitoring includes measuring the rate of change of the temperature of the orifice area of said feeder.

4. A method as defined in claim 1 in which said environment controlling includes releasing gaseous material in said zone, and said monitoring includes detecting a diminishment of release of said gaseous material in said attenuation zone below a predetermined amount.

5. A method as defined in claim 1 in which said environment controlling includes releasing cooling gases in said zone, and said monitoring includes detecting a diminishment of cooling effect of said gases below a predetermined level.

6. A method as defined in claim 5 in which said diminishment detection includes detecting a reduction of flow of said cooling gases into said zone.

7. A method as defined in claim 5 in which said diminishment detection includes detecting a predetermined rise in temperature of said cooling gases being released in said zone.

8. A method as defined in claim 1 in which said environment controlling includes placing at least one heat removing element in heat transfer relationship with said stream in said zone, and said monitoring includes detecting the removal of said element from said zone.

9. A method as defined in claim 8 in which said detecting includes sensing a predetermined rate of change of temperature in said zone.

10. A method as defined in claim 8 in which said environment controlling further includes passing a heat exchange medium in heat transfer relationship with said element to remove heat from said zone, and said monitoring includes detecting a predetermined change in temperature in said heat exchange medium to indicate removal of said element from said zone.

11. A method as defined in claim 1 in which said environment controlling includes passing a heat exchange medium through said zone in heat transfer relationship with said stream, and said monitoring step includes detection of a cessation of passage of said medium through said zone.

12. A method of producing glass fibers comprising the steps of issuing a stream of molten glass from an orifice formed in a feeder, heating said feeder, sensing the temperature of the orifice area of said feeder, regulating the amount of heat supplied to said feeder in response to said feeder temperature sensing to maintain said molten glass at a desired fiber-forming temperature, attenuating said stream into a fiber, measuring the rate of change of the temperature of said orifice area, and reducing the amount of heat supplied to said feeder to restrict stream flow in response to the detection of a predetermined rate of change upward of said orifice area temperature to prevent said molten stream from flooding said orifice area of said feeder.

13. Apparatus for producing glass fibers comprising feeder means for retaining a supply of molten glass, said feeder means having at least one orifice formed therein for issuing a stream of molten glass, means for attenuating said stream into a fiber, means for supplying heat to said feeder means, means for regulating the amount of heat supplied to said feeder means to maintain said molten glass at a desired attenuating temperature, means for controlling the environment in a zone adjacent said stream and feeder to assist in fiber formation, means for detecting a loss of effectiveness of environmental control, and means responsive to said detecting means for reducing the amount of heat supplied to said feeder to restrict stream flow from said orifice on loss of effectiveness of environmental control.

14. Apparatus as defined in claim 13 in which said environmental control means includes at least one heat removal element in heat transfer relationship with said stream, and in which said detecting means includes means for detecting the presence of said heat removal element in said zone in said heat transfer relationship.

15. Apparatus as defined in claim 14 in which said presence detecting means includes means for sensing temperature in said zone.

16. Apparatus as defined in claim 14 in which said regulating means includes means for sensing the temperature of the orifice area of said feeder, and in which said presence detecting means includes means for measuring the rate of change of temperature sensed by said orifice area temperature sensing means.

17. Apparatus for producing glass fibers comprising feeder means for containing a supply of molten glass, said feeder means having a plurality of orifices formed therein for issuing a plurality of streams of molten glass, means for attenuating said streams into glass fibers, means for supplying heat to said feeder means, means for sensing the temperature of the orifice area of said feeder means, regulator means responsive to said orifice area temperature sensing means for controlling the amount of heat supplied to said feeder means to maintain said molten glass at fiber-forming temperatures, means for controlling the environment in a zone adjacent to said streams and said orifices formed in said feeder to assist in fiber formation, means for detecting a loss of environmental control and providing a loss signal, and means responsive to said loss signal for reducing the amount of heat supplied to said feeder means to cool said molten glass below fiber-forming temperatures.

18. Apparatus as defined in claim 17 in which said detecting means comprises means for measuring the rate of change of temperatures sensed by said orifice area temperature sensing means.

19. Apparatus as defined in claim 17 which further includes means for detecting a resumption of effectiveness of said environmental control and providing a present signal, and means responsive to said present signal for enabling restoration of said molten glass to fiber forming temperatures.

20. Apparatus as defined in claim 19 which further includes means for measuring the difference between a desired fiber forming temperature and an actual temperature of said feeder means which is below said fiber forming temperature, means responsive to a measured difference between said desired and actual temperatures in excess of a predetermined amount for controlling the rate of increase of heat applied to said feeder means to prevent damage to said feeder means.

\* \* \* \* \*